April 7, 1959 — C. L. NIGH — 2,881,033
BEARING ASSEMBLY
Filed June 17, 1957
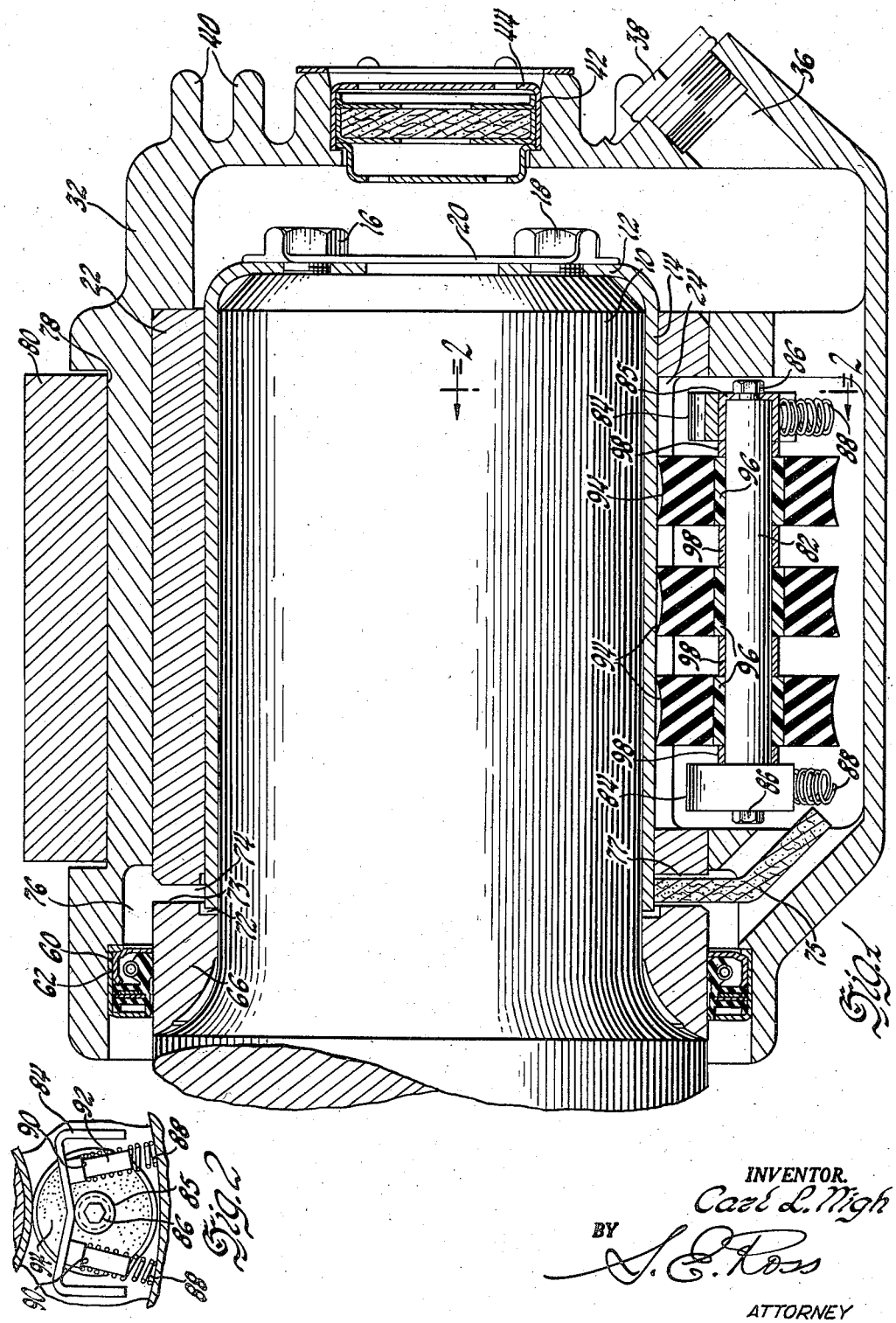
INVENTOR.
Carl L. Nigh
BY
J. E. Ross
ATTORNEY

2,881,033

BEARING ASSEMBLY

Carl L. Nigh, Brownsburg, Ind., assignor to General Motors Corporation, Detroit, Mich., a corporation of Delaware Application June 17, 1957, Serial No. 666,106

2 Claims. (Cl. 308—91)

This invention relates generally to a journal-bearing assembly and more particularly to one for railway cars and the like in which a roller lubricator is employed.

This invention is related to co-pending application Serial No. 529,625, filed August 22, 1955, and application Serial No. 566,460, filed February 20, 1956, assigned to the assignee of the present invention. The present invention is more particularly concerned with a journal bearing assembly and lubricating means therefor in which an improved roller lubricator is employed.

Among the objects of the present invention are one or more of the following, singly or in combination: to provide an improved bearing-journal construction wherein proper alignment is maintained at all times between the journal and bearing; to provide an improved construction in which replaceable, wear-resistant parts are provided; to provide a construction having improved lubricating means; to provide a bearing of the cartridge type having effective means to seal lubricant in a housing and to prevent entrance of dirt into the housing; to provide a railroad bearing having improved axle end play control; to provide an improved bearing assembly having effective means for dissipating heat of friction to the atmosphere; to provide a bearing assembly that is substantially tamper-proof and to provide a construction that can be readily adapted for use with railway cars having bearings of conventional design.

Other objects and advantages of the invention will become more apparent as the description proceeds.

Reference is herewith made to the accompanying drawing illustrating a construction in accordance with one embodiment of the invention.

In the drawing:

Figure 1 is a longitudinal section through a bearing, housing and journal.

Figure 2 is a cross-sectional view on line 2—2 in Figure 1.

In the drawing, 10 represents a journal or axle such as one for a railway passenger or freight car. At the right-hand end of the axle, as viewed in Figure 1, there is shown a hardened, generally cup-shaped member 12, the side walls of which form a sleeve 14. The member 12 is shrink-fitted over the end of the axle 10 to secure the same thereto. It is additionally secured to the axle by means of screws 16 and 18. A locking device 20 keeps the screws from loosening. The generally cup-shaped member 12 may be made of any suitable wear-resistant material. In the construction illustrated, it is a hardened steel member formed of low-carbon sheet steel carbonitrided on the outer surface thereof and thereafter hardened. During operation, the sleeve portion 14 of the cup is in effect a portion of the journal 10. The replaceable cup may be removed should wear or scoring occur and a new one put on in its place.

A sleeve-type bearing 22 is shown in bearing engagement with sleeve portion 14 of the journal. The sleeve bearing 22 has an opening or window therein at the underside thereof as indicated at 24. The bearing 22 may be formed of any suitable bearing material, a highly satisfactory material being an aluminum alloy in accordance with Schluchter United States Patent No. 2,238,399.

The bearing 22 is carried by a housing 32 and is secured thereto as by dowels (not shown). The lower portion of the housing is adapted to contain a supply of oil for lubricating the journal. The housing has a screw-threaded opening 36 for admitting oil to the housing. This opening is closed by a screw plug 38. The housing also has a series of fins 40 which act to dissipate frictional heat. In the wall of the housing above the filler opening is an opening 42 within which is a breather cap assembly 44 which permits air to freely pass in and out of the housing but to retain oil in the housing. The upper portion of the housing is provided with a seat 78 for a pad 80 which prevents the housing against rotational movement.

At the end of the housing 32 opposite that which carries the breather assembly there is provided a portion 60 forming a support for an oil seal 62. The outer periphery of the oil seal contacts the housing and the inner periphery contacts a hardened thrust ring 66 secured to the axle 10 by a shrink fit. The shrink-fitted thrust ring also has a cutaway portion 72. The thrust ring may be formed of a hard wear-resistant material. Carbonitrided and hardened steel is a satisfactory material. The face 73 of the thrust ring is normally spaced at 74 from the end of the sleeve bearing 22 as illustrated in Figure 1. However, when going around a curve or otherwise when there are forces causing relative movement between the bearing and axle, this space 74 will close and the end of the bearing sleeve will contact the face 73 of the thrust ring. In order to lubricate these faces, there is provided a wick lubricator 75, the lower end leading to the oil supply in the lower portion of the housing and the upper end being mounted in a cutaway portion 77 of the lower porton of the sleeve bearing. Adjacent the left-hand end of the bearing there is provided an annular groove 76 in the housing to permit return of excess oil to the lower portion of the housing.

The construction thus far described is generally similar to that of Serial No. 529,625. The present invention comprises an improved roller lubricator assembly located in the lower portion of the housing 32 for lubricating the journal or axle. The roller lubricator assembly shown in the drawing comprises a shaft 82, inverted generally U-shaped brackets 84 at each end of the shaft, two generally cup-shaped members 85 secured to the brackets in any desired manner, welding for example, for supporting the ends of the shaft, screws 86 for securing members 85 to the shaft, four coil springs 88, one end of each spring contacting the bottom of the housing and the opposite end of each spring contacting a shoulder 90 on pins or bosses 92 carried by the inverted U-shaped brackets, three neoprene or felt rollers 94 shrink-fitted on bushings 96 of nylon or other suitable material on shaft 82, spacers 96 between the neoprene rollers and spacers 98 between the outer two neoprene rollers and the inverted U-shaped brackets. The four coil springs bias the shaft and rollers upwardly so that the rollers are held in contact with the journal 10 through window 24 in the bearing. The rollers 94 are rotated with their supporting bushings on shaft 82 by contact with the journal. The lower portions of the rollers are immersed in the lubricating oil in the housing and, upon rotation, carry the oil to the journal. Should any wear of the rollers occur, the springs continue to bias the rollers into contact with the journal. Thus the rollers have a long effective life. A most effective means for lubricating the journal and bearing is provided. The roller lubricator assembly may be assembled in the housing or removed therefrom as a unit.

From the foregoing it will be apparent that the present construction incorporates a one-piece housing which surrounds the journal and which contains the bearing lubricant and oil seal. The full round bearing maintains proper journal and bearing alignment, whereas in designs incorporating a pad bearing, the journal is free to roll out of the bearing under impact conditions. By means of the hard replaceable sleeve journal, wear and scoring is reduced greatly. The bearing is effectively lubricated by the spring-biased roller lubricating means. The construction provides an effective oil seal to retain the lubricant in the housing and to prevent entrance of dirt into the housing. The life of the seal is extended by running on a smooth hard thrust ring. The relatively simple seal is made possible because the journal motion is closely controlled by the bearing. Axle end play control is improved by the increased thrust area, by positive lubrication of the bearing thrust surface, and by use of the hardened steel thrust ring shrunk on the axle. The ring is of hard, wear-resistant material to decrease thrust ring and bearing wear and scoring. By means of the full round bearing having a large area of contact with the housing, heat transfer is improved. The heat transfer is further improved because the lower portion of the bearing is near the free oil in the sump in the housing. In addition, splashing of the oil on the bearing aids in transferring the heat to the bearing housing. By means of the large radiating area of the bearing housing 32, the heat of friction is effectively dissipated to the atmosphere. The bearing assembly is tamper-proof since the railway car must be raised to gain access to the inner moving parts, the lubricant and the lubricator. The breather assembly readily permits air to flow into and out of the cartridge housing to minimize pressure differentials in the housing. Without this feature, the pressure differentials tend to cause oil loss through the oil seal.

Numerous changes and modifications of the embodiment of my invention disclosed herein may be made without departing from the principle and spirit of the invention.

I claim:

1. A journal, bearing and lubricator assembly comprising a free-ended journal having a hard replaceable sleeve shrink-fitted thereon, a bearing surrounding said sleeve, the lower portion of said bearing having an opening therein, roller lubricator means below said opening comprising a shaft, roller lubricators rotatably mounted on said shaft, means for supporting the ends of the shaft, and spring means for biasing the means supporting the ends of the shaft toward the opening in the bearing to frictionally engage the rollers with the journal through said opening whereby the rollers are rotated by said journal, a hardened thrust ring fixed to said journal remote from said free end and having a face in alignment with an end of said bearing remote from and facing away from the free end of said journal, a housing surrounding the journal, roller lubricator means and thrust ring, breather means for said housing permitting air to pass freely into and out of said housing, means for admitting oil to the housing, an oil seal between the thrust ring and housing, wick means for lubricating the end of the thrust ring adjacent the end of the bearing remote from said free end, and an annular groove in the housing adjacent the thrust ring and adjacent the bearing end for returning excess lubricant to the lower portion of the housing.

2. A journal, bearing and lubricator assembly comprising a free-ended journal having a hard replaceable sleeve shrink-fitted thereon, a bearing surrounding said sleeve, the lower portion of said bearing having an opening therein, roller lubricator means below said opening, spring means for continuously biasing said roller lubricator means into contact with the journal through said opening, said lubricator being rotated by frictional contact with the journal, a hardened thrust ring fixed to said journal remote from said free end and having a face in alignment with an end of said bearing remote from and facing away from the free end of said journal, a housing surrounding the journal, roller lubricator means and thrust ring, breather means for said housing permitting air to pass into and out of said housing while retaining oil in said housing, means for admitting oil to the housing, an oil seal between the thrust ring and housing, wick means for lubricating the end of the thrust ring adjacent the end of the bearing remote from said free end, and an annular groove in the housing adjacent the thrust ring and adjacent the bearing end for returning excess lubricant to the lower portion of the housing.

References Cited in the file of this patent

UNITED STATES PATENTS

| | | |
|---|---|---|
| 274,159 | Whiting | Mar. 20, 1883 |
| 522,838 | Knauer | July 10, 1894 |
| 1,012,218 | Ono | Dec. 19, 1911 |
| 1,127,614 | Ghyselinck et al. | Feb. 9, 1915 |
| 2,498,520 | Blackmore | Feb. 21, 1950 |
| 2,731,307 | Arblaster | Jan. 17, 1956 |
| 2,785,020 | Browne | Mar. 12, 1957 |